Patented Nov. 11, 1952

2,617,742

UNITED STATES PATENT OFFICE 2,617,742

ELECTROCONDUCTIVE ARTICLE AND PRODUCTION THEREOF

Earl R. Olson, Columbus, Ohio, assignor, by mesne assignments, to Pittsburgh Plate Glass Company No Drawing. Application December 19, 1951, Serial No. 262,473

15 Claims. (Cl. 117—54)

This invention relates to the production of transparent films or coatings upon lime soda glass, and to novel glass products having electroconductive coatings. In United States Letters Patent No. 2,118,795 granted to J. T. Littleton, a process is described wherein an electroconductive coating is deposited upon a glass insulator by heating the insulator to a temperature of 600 to 750° C. and spraying the hot insulator with stannic chloride. The films thus deposited are stated to be iridescent and transparent to solar heat, and are said to improve the properties of insulators.

Since such films possess some transparency, attempts have been made to apply them to transparent plate or window glass sheets to be used as viewing closures and to make use of the conductive film as a heating element in an electrical circuit in order to heat the glass and thus to prevent or minimize formation of fog, snow or ice thereupon. However, serious difficulties arise from such attempts.

In order to obtain a satisfactory article suitable for use at low voltages, it is desirable that the film have an electrical surface resistance below 500 ohms per unit square, and preferably below about 200 ohms per unit square. The expression of electrical resistance in terms of ohms per unit square is a convenient method of expressing the resistance of thin films and, in reality, is the specific resistivity of the film divided by the average film thickness within the area of a square. While transparent films having the desired surface resistance can be deposited upon soda lime glass using stannic chloride alone, excessively high temperatures, approximating the melting point of the glass, must be used in order to obtain films within the proper range of electroconductivity. Consequently, special agents are used in order to make possible the deposition of a satisfactory film at a lower temperature.

Further research has led to the discovery that, by use of proper precautions and special solutions, transparent films can be obtained which have unusually low electrical resistance. Thus, it has been found that the use of certain agents, such as methanol or phenyl hydrazine hydrochloride, in conjunction with stannic chloride produces a transparent coating upon lime soda or soda lime glass which has a resistance, in terms of ohms per unit square, below 500, and generally below 150, at a temperature sufficiently low to permit ready handling of lime soda glass. Such low electrical resistance has made possible the provision of viewing closures in the cabins of automotive vehicles, such as aircraft and automobiles, which have a transparent surface, which closures may be electrically heated in a convenient manner. The provision of such an article affords a convenient means of preventing accumulation of fog, ice or snow upon the viewing closure, simply by electrically heating the glass, using the transparent films as the resistance element.

Despite the fact that the above process permits production on a large scale of viewing closures having conductive films with electrical resistance below 500 ohms per unit square, a portion of products thus produced have been defective due to the presence of haze in the film. This haze sometimes developed in localized areas of the glass sheet and, at other times, the entire surface of certain articles was found to be hazy. In consequence, an undue number of glass panels have been rejected as unsuitable for use as viewing closures. Losses due to these "rejects" have very materially increased the cost of production of suitable viewing closures.

The present invention provides a convenient method whereby much of the haze in glass panels of the type described may be eliminated and the number of panels rejected due to the presence of haze or other unsightly defect may be substantially reduced. According to the present invention, it has been found that haze and similar defects may be eliminated, at least to an appreciable degree, by reducing the alkali metal content of the surface to be coated prior to application of the transparent electroconductive coating. This may be accomplished by establishing an intermediate film, layer, or zone which is free of alkali (or at least is lower in removable alkali content than is an untreated glass surface after several minutes' heating at 900–1200° F.) between the glass and the electroconductive coating. Thus, haze may be reduced by treating the glass surface to remove at least a portion of the alkali metal atoms from the surface prior to application or formation of the transparent film. A further method of effecting a reduction of haze involves the application or deposition of an intermediate film which is low as to removable alkali. In either case, an electroconductive tin oxide or equivalent electroconductive transparent coating is applied to the treating glass surface.

According to a process herein contemplated, a glass sheet or other article is treated to remove alkali from the surface, or to cover the surface with a coating which contains no objectionable amount of alkali, and thereafter is heated above about 500° F., preferably 800 to 1250° F., and the heated sheet is sprayed or otherwise contacted with an hydrolyzable or decomposable metal compound, such as stannic chloride, which is capable of producing a transparent film upon the glass. Care should be exerted to avoid an excessively long heating period since alkali metal in the interior of the glass tends to migrate to the surface through the de-alkalized area or film to an objectionable degree. Consequently, heating should be discontinued and the electroconductive film should be applied before such migration can occur to a degree such as to raise the alkali metal atom concentration at the surface to its initial value. The process results in the production of a new and valuable product which is transparent and low in haze. Such product comprises a soda lime glass base having a surface at which the $Na_2O/SiO_2$ ratio is lower than is the $Na_2O/SiO_2$ ratio at the surface of the untreated soda lime glass after heating at an elevated temperature, for example, 1150° F. for several minutes, and a transparent metal oxide coating on this surface.

In order to minimize and avoid tendency of such alkali metal atoms to migrate during the coating operation, it is advantageous to conduct the de-alkalizing treatment at a temperature above about 400° F., and usually at least in the same general range of not more than 100° F. below the temperature at which the glass is heated for application of the transparent electroconductive coating. However, the de-alkalization may be conducted at room temperature as will be apparent from the ensuing disclosure.

This invention is particularly applicable for use with the treatment of window glass or plate glass or analogous soda lime glass since haze due to alkali does not appear to be serious with other forms of glass. Furthermore, it is of particular importance when metal halides are used to form the transparent electroconductive film.

Various methods may be provided for reducing the alkali metal atom concentration at the surface of the glass. For example, the $Na_2O$ content of the surface may be reduced by exposure of the glass to the action of an acid or acidic gas which does not etch the glass in order to react with the $Na_2O$ or other similarly combined alkali metal atoms and to form a water soluble salt. This salt may be washed from the surface by a water wash. As an illustration, the glass may be exposed to the action of sulfur dioxide gas at an elevated temperature, for example, 100 to 500° C., or to aqueous sulphuric acid, hydrochloric acid, nitric acid, etc. at room temperature or above, and the glass washed to remove soluble alkali salts from the glass surface.

Accordingly, sheets of window or plate glass to be so treated may be heated above about 400° F. but below the temperature at which the glass is molten, for example, 800 to 1250° F., and exposed to a sulfur dioxide atmosphere for about 30 minutes. The glass so treated may be cooled, washed, and then treated to deposit the electroconductive film herein contemplated. In lieu of sulfur dioxide treatment, the heated glass may be sprayed with an aqueous acid solution which is capable of reacting with $Na_2O$. For example, aqueous hydrochloric acid, boric acid, nitric acid, oxalic acid, acetic acid, phosphoric acid, phosphorous acid, sulphurous acid or sulphuric acid may be used for this purpose. Frequently, it is desirable to use a solution containing some quantity of methanol in order to improve contact of the solution with the glass. Moreover, other acidic gases which do not etch glass, such as chlorine, chlorine monoxide, chlorine dioxide, phosgene, phosphorous pentoxide, HCl, bromine, iodine vapor, HBr, or phosphorous oxychloride, may be used. Liquid acid halides, such as thionyl chloride, sulphuryl chloride, thionyl bromide, etc., may be sprayed directly upon the glass without use of an aqueous solution.

In each case where the glass is exposed to the action of the above acids, haze is developed upon the surface of the glass, apparently because of formation of sodium or other alkali metal salts. This haze is quite similar to that which is obtained in the electroconductive films except that it is easily removable and is not embedded in the film. Consequently, simple washing of the cooled glass removes this haze. Hence, the process involves development and removal of the haze before the transparent film is applied.

A further method of de-alkalizing involves the use of base exchange agents which can exchange another cation or anion, such as hydrogen, for sodium ion. Generally speaking, any compound which can combine with $Na_2O$ or any ion exchanger which can exchange other ions for sodium ions may be used to reduce the alkali content of the glass surface. In such a process, the glass is coated with the cation or base exchanger and heated at a temperature above about 500° F. but below the temperature at which the glass becomes molten, preferably 800 to 1250° F. This heating may be continued for a convenient period, for example, several minutes to an hour or even more. Following this heating, the glass is cooled and the exchanger, such as clay, is washed from the glass surface. This process removes alkali metal atoms from the surface by exchange of hydrogen or equivalent atoms in the clay for the alkali metal atoms. Concurrently with or in lieu of this reaction, the silicon-oxygen bond may be broken, thus releasing alkali metal to the clay. Various clays, including metakaolin or kaolin purified by electrodialysis, or other highly purified clays or unpurified clays, such as china clay, may be used for this purpose.

A further method of removing alkali from the glass surface involves heating the glass to a temperature of 400 to 550° C. and exposing the hot glass to the action of a vaporized metal halide in the absence of oxygen for several hours. Typical halides which may be used include cuprous chloride, cupric chloride, and thallous chloride. If haze is developed during this treatment by virtue of formation of NaCl, it may be removed by washing the glass with water after cooling.

It will be noted that the de-alkalizing processes described above involve treatment of glass while heated above about 500° F. Such elevated temperature increases the rate of de-alkalization. Lower temperatures may be used in such processes although the time of treatment required may be longer. Soaking of glass in aqueous hydrochloric or sulphuric acid for several hours at room temperature to 100° C. effects a satisfactory de-alkalizing of the surface.

The de-alkalization of the glass prior to deposition of the transparent coating herein contemplated affords a number of advantages. Not only does this process materially reduce the haze but it also improves the adhesion and durability of the film.

After the de-alkalizing operation has been completed, the glass is washed and scrubbed, if necessary, to remove the de-alkalizing agent and its reaction products which may be alkali metal salts. Thereafter, the glass may be heated to a temperature above about 500° F., usually 800 to 1250° F., and the heated glass is sprayed (usually in atmospheric air which possesses some amount of moisture characteristic of atmospheric air) with the metal compound, such as stannic chloride. The period of heating should be limited since, if heating is continued for an excessive period, migration of alkali metal atoms from the interior of the glass to the surface thereof tends to occur, thereby nullifying the effect of the previous de-alkalizing step to an objectionable degree. Usually, a heating period of 1 to 10 minutes is sufficient for the purpose. Longer times are permissible so long as the amount of alkali metal diffusion does not become excessive, but rarely is heating continued over one hour.

According to the present invention, it has been found advantageous to correlate the respective temperature of heating and the heating times of the de-alkalizing and coating operations. It has been found to be advantageous to effect the de-alkalizing operation while heating for a period substantially longer, usually at least two to five times longer, than the heating period prior to coating. For example, usual practice is to heat the glass by placing it in a furnace chamber heated to 800 to 1250° F. for about 2 to 5 minutes prior to spraying with stannic chloride or other compound. Consequently, the heating operation prior to, or in conjunction with, the de-alkalizing operation generally is conducted over a period of 10 to 30 minutes or even longer. The de-alkalizing operation usually is held at a temperature not substantially below that of the heating immediately prior to coating, and preferably not more than 100° F. below such temperature. This process materially reduces the tendency of alkali metal atoms or ions to diffuse to the surface during the heating immediately prior to coating. However, it should be understood that heating in conjunction with the de-alkalizing may be dispensed with although the de-alkalizing may be slower in such a case.

When the de-alkalized glass has been heated for the desired period of time, it is withdrawn from the heating zone and immediately is sprayed in air or otherwise contacted with the electroconductive film-forming compound either as a vapor or solution. When a solution is used, a quantity of the coating solution is placed in an atomizing spray gun and the hot glass is sprayed with an atomized spray of the solution for a few seconds, usually of the order of 1 to 20 seconds. Usually, this coating operation is conducted in the presence of an oxygen source, such as water, air, or oxygen. Conductive coatings have been obtained when air did not appear to be present although it is probable that oxygen, available either as elemental oxygen or combined in water or similar compound, is essential to this operation.

When a tin compound, such as stannic chloride, is used as the coating material, the process produces a transparent electroconductive film which largely comprises an oxide of tin. Such films are at least 95 to 99 per cent tin oxide and contain certain impurities, such as chlorine, carbon, and silicon, and may contain some amount of elemental tin.

In depositing films of tin oxide upon soda-lime glass, it has been found that certain agents, notably methanol and phenyl hydrazine hydrochloride or antimony chloride, materially improve the coating, particularly as to its electroconductivity. A wide variety of other agents of this character may be used, such as those described in an application of W. O. Lytle for United States Letters Patent, Serial No. 762,658, filed July 22, 1947.

The amount of the addition agent which is used is capable of substantial variation, depending upon the results desired. Small amounts (even traces) show an improvement in the conductivity of the film, and such improvement increases to a maximum as the amount of addition agent is increased. In general, the amount of such agent which is used in conjunction with the tin compound is at least 0.01 to 0.1 mol per mol of tin compound. As an example, with agents such as methanol, it has been found that a solution comprising 1000 parts by weight of $$SnCl_4 \cdot 5H_2O$$

and 1 part by weight of methanol produced a film having a specific resistivity of about 0.012 ohm centimeter, whereas a solution containing equal parts by weight of stannic chloride pentahydrate and methanol produced a film having a specific resistivity below 0.002. Since larger amounts of such agents do not produce markedly greater improvement of the film, it is quite rare to use more than 50 parts by weight of addition agent per part by weight of tin compound.

Quite frequently, mixtures of agents have been found to be preferable. For example, alcohols, such as methanol or others above listed, are found to function better when used with hydrazines, such as phenyl hydrazine or phenyl hydrazine hydrochloride or the other hydrazines or their hydrochlorides, such as above listed. In such a case, at least 0.01 mol of the hydrazine, such as phenyl hydrazine, and 0.01 mol of the alcohol, such as methanol, per mol of tin compound, such as stannic chloride, normally are used.

The invention has been described with special reference to the use of stannic chloride as the tin compound for production of the electroconductive film. This compound is particularly valuable since it may be used either in aqueous medium or in vapor state to produce films which visibly appear to be flawless. Other film-forming tin compounds (particularly compounds which are hydrolyzable or decomposable to produce a tin oxide or like electroconductive coating) are useful for this purpose. Thus, stannic bromide, $SnBr_3Cl$, $SnBrCl_3$, $SnCl_2I_2$, $SnI_4$, stannic sulphate, stannic phosphate, stannic nitrate, or stannous salts, such as stannous acetate, stannous oxalate, stannous chloride, stannous nitrate, stannous tartrate, and like salts may be used. Organic tin compounds also may be used. Such compounds include those having the structure $R_mSnX_n$ where R is a monovalent aryl, aliphatic, or aryl aliphatic radical linked to the tin atom through carbon, and X is another monovalent aryl, aliphatic, or aryl aliphatic radical linked to the tin atom through carbon, or is a radical, such as hydride, hydroxyl, chloride, bromide, iodide, acetate, etc., and the sum of m and n is 4, such as tetra ethyl tin, tetra methyl tin, tetra-n-heptyl tin, tetra-dl-amyl tin, tetra-p-xylyl tin, tribenzyl ethyl tin, tribenzyl tin chloride, tributyl tin chloride, triethyl-n-amyl tin, tolyl tin trichloride, ethyl tin tribromide, tribenzyl stannic acid, ethyl chlorostannic acid, diethyl tin oxide. Moreover, other tin compounds, such as diphenyl tin, diethyl tin, stannic bis acetylacetone dichloride or dibromide, etc., may be used.

In general, it is desired to use tin compounds which are liquid or which may be vaporized readily or which may be dissolved in solvents, such as water, or organic solvents, such as benzene, xylene, toluene, acetone, methanol, ethanol, methyl ethyl ketone, etc., in order that the tin compound may be applied to the base as a homogeneous liquid or solution. Such solutions normally contain at least 10 to 50 parts by weight of tin compound per 100 parts by weight of solution.

It has been found especially advantageous to deposit the electroconductive film by spraying an aqueous solution of the tin compound. In the case of stannic chloride, the solution preferably should contain not less than 10 per cent by weight of the stannic chloride. Higher concentrations, up to the solubility of the stannic chloride in water, normally are used. Similar concentrations of other tin salts also are used.

According to a further embodiment, mixed oxides may be applied. For example, an aqueous solution containing the usual amount of stannic chloride or other tin compound may have dissolved therein or mixed therewith compounds of other metals, such as indium chloride, cadmium bromide, cadmium acetate, zinc bromide, zinc acetate, chromium chloride, ferric chloride or other compound of these metals, to modify the properties of the film. As a typical embodiment, 10 to 500 per cent by weight of cadmium chloride or acetate, based upon the weight of stannic chloride in the solution, may be added to the solutions of Examples I, II, III, or IV, adding sufficient water if necessary to dissolve the mixture, and these solutions may be used in lieu of the solutions described in such examples.

Not infrequently, it is desirable to apply the transparent coating to the de-alkalized glass base by recourse to a vaporized tin compound, such as stannic chloride vapor. In such a case, the vapor of the tin compound may be mixed with the vapor of the addition agent (methanol, etc.) and the vapor mixture sprayed upon the glass base. During the coating operation, whether by use of anhydrous vapor or aqueous solution of the tin compound, the hot glass normally is supported by convenient means in atmospheric air which normally contains some moisture. Consequently, the spraying operation is conducted in the presence of water, even if no water is present in the spray itself.

Since the haze which is avoided by recourse to this invention is created largely by sodium, the invention is applicable to provision of electroconductive coatings upon various types of glass having a high content of sodium. These glasses have the general composition:

| | |
|---|---|
| Alkali metal oxide, such as $Na_2O$, and/or $K_2O$ | 10 to 35 per cent by weight |
| Alkaline earth metal oxide, such as CaO, and/or MgO | 5 to 25 per cent by weight, the CaO content being not less than 5 per cent by weight |
| $SiO_2$ | 50 to 75 per cent by weight |
| $Al_2O_3$ | 0 to 20 per cent by weight |

It will be understood that various other materials, usually in small amount (1 to 5 per cent by weight or less), also may be present. Such materials include arsenic, antimony, fluorine, lithium, barium, zinc, titanium, $B_2O_3$, iron, cobalt, nickel, lead, phosphate and the like.

As previously stated, the invention has been found to be especially valuable when used in the coating of window and plate glass which are made of lime-soda glass. Such glass usually has the following composition:

| | |
|---|---|
| Alkali metal oxide, such as $Na_2O$, and/or $K_2O$ | 10 to 18 per cent by weight |
| Alkaline earth metal oxide, such as CaO, and/or MgO | 5 to 16 per cent by weight, the CaO content being at least 5 per cent by weight |
| $SiO_2$ | 65 to 75 per cent by weight |
| $Al_2O_3$ | 0 to 5 per cent by weight |

A typical lime-soda glass used as window glass has the following composition:

| | |
|---|---|
| $SiO_2$ | 71.38 per cent by weight (usual variation 71 to 73 per cent by weight) |
| $Na_2O$ | 12.79 per cent by weight (usual variation 12 to 14 per cent by weight) |
| CaO | 9.67 per cent by weight (usual variation 8 to 11 per cent by weight) |
| MgO | 4.33 per cent by weight |
| $Na_2SO_4$ | 0.75 per cent by weight |
| NaCl | 0.12 per cent by weight |
| $Fe_2O$ | 0.15 per cent by weight |
| $Al_2O_3$ | 0.81 per cent by weight |

Products which are obtained according to this invention, when using an agent such as methanol, have a resistance below 500 ohms per unit square. The Hall factor of products prepared using methanol or similar agent is about 0.01 to 0.04 cubic centimeter per ampere second (as determined by the method described in "Galvanomagnetic and Thermomagnetic Effects" by L. L. Campbell, published 1923 by Longmans & Green, pages 8 to 26, inclusive) whereas when no methanol or similar agent was used, the Hall constant was 0.09. The products are more consistently free from haze than are products prepared without pre-treating the glass base.

Other pertinent properties of these films on lime-soda glass are:

| | |
|---|---|
| Mobility cm.$^2$/volt second | 8 |
| No. ionized impurity centers per cm.$^3$ | about $10^{20}$ |
| Mean free path of current carriers | about $6 \times 10^{-6}$ cm. |
| Index of refraction of film | about 2 |

Because of the lower specific resistivity of the films produced according to this invention, plate or window glass provided with conductive films of high transparency have a resistance per unit square below 500, and generally less than 150 ohms per unit square, and a haze factor below 5 per cent.

The haze factor is measured by a method designated "A Tentative Method of Industry for Transparent Plastics by Photoelectric Cell," described in the publication "A. S. T. M. Standards," 1944, part 3, pages 1653–5, American Society Testing Materials, New York.

The color characteristics of the coating are determined to a substantial degree by the thickness of the coating. Colorless coatings may be obtained by use of tin oxide or similar coatings which are below about 75 to 100 millimicrons in thickness. Thicker coatings having a thickness of 75 to 600 millimicrons possess a color depending upon the exact thickness. The exact thickness of the film depends upon the number of coatings and/or the length of time of spraying. In general, the film thickness will not be in excess of 800 microns.

It will be apparent from the above description that the glass product of this invention comprises a lime-soda glass base provided with a transparent electroconductive metal oxide film or layer thereon and having a transparent intermediate zone, layer, or film between the glass base and the transparent metal oxide film. This intermediate film is characterized by the fact that the concentration (if any) of alkali metal present therein is below the concentration of alkali metal untreated glass when such glass is heated to an elevated temperature, and may even contain no alkali.

It will be apparent that the intermediate film or surface on the soda-lime glass may contain no $Na_2O$, or less surface $Na_2O$ than the surface $Na_2O$ present upon ordinary untreated glass. However, this does not appear to be essential so long as the surface removable $Na_2O$ content, immediately prior to application of the electroconductive film, is below that of untreated glass which has been heated, after formation into sheets or similar form, to the temperature at which the electroconductive coating is applied. Thus, it has been found that when plate glass samples 6 inches by 6 inches by ⅛ inch were immersed in 350 cubic centimeters of water for two hours, the amount of $Na_2O$ which is dissolved in the solution amounts to about 0.05 to 0.4 milligram per square foot of glass surface. On the other hand, when such plates are heated for four minutes at 1150° F. and immersed in 350 cubic centimeters of water as above, the $Na_2O$ content of the water determined as sodium magnesium uranyl acetate amounts to from about 1.5 to as high as 3 (the average being about 2) milligrams per square foot of glass surface, due to migration of $Na_2O$ to the glass surface.

The above test affords a convenient method of comparing the $Na_2O$ content of untreated glass with dealkalized or other glass provided with the film herein contemplated. Samples of untreated glass and treated glass may be heated in a furnace at the temperature, for example, 1150° F., and for the time, for example, 4 minutes, to be used in the application of the electroconductive coating. These samples then may be cooled and their surface $Na_2O$ content compared as described above. If the $Na_2O$ content of the treated glass sample is found to be lower than that of the untreated glass sample after such heating, the treated glass will, in general, afford improvement as to haze.

In general, appreciable improvement is obtained when the glass to be coated with the electroconductive film exhibits available surface $Na_2O$ content, as determined above, which is less than about 1 milligram, and preferably less than 0.5 milligram per square foot of glass surface. The intermediate films produced as herein contemplated usually exhibit available $Na_2O$ contents of 0.05 to 0.4 milligram per square foot, even after the glass provided with the film has been heated at 1150° F. for several minutes. Thus, it appears that the de-alkalizing treatment not only removes $Na_2O$ immediately upon the surface but also removes $Na_2O$ under the surface which tends to diffuse to the surface during heating.

Where the intermediate film is formed by de-alkalizing the glass surface, as described heretofore, the film is formed in situ on the surface of the glass base, and comprises silica of lower alkali content than that of the base. Such a film is essentially integral with the base and usually is not distinguishable visually therefrom. In fact, it may be a continuation of the silica lattice of the base.

It is not intended to limit the invention to those intermediate films of low alkali content which are produced by the de-alkalization above described since other films may be deposited upon the glass surface in order to provide the glass with a surface of decreased alkali concentration. Consequently, the terms "film" or "surface," as applied to these intermediate films or surfaces, refer to those films, layers or surfaces which are deposited or formed upon the base as well as those formed in situ thereupon. Such films are very thin, usually being less than 100 millimicrons, and rarely being above 300 millimicrons in thickness. They may be in the form of definite layers or of a thin de-alkalized surface zone extending from the outside into the interior of the glass without any clear demarkation of layer formation.

Intermediate transparent adherent films or compositions which reduce the $Na_2O$ content of the surface may be deposited on the glass in lieu of de-alkalizing, or may be deposited upon the de-alkalized surface. Such films may comprise silica or a transparent metal oxide or similar heat resisting or refractory coating of the above designated thinness. For example, transparent silica films may be applied according to the processes described in United States Letters Patent No. 2,417,147, granted March 11, 1947. According to another method, a silicic acid ester, such as ethyl ortho silicate or equivalent lower alkyl ester, may be partially hydrolyzed, a glass sheet dipped in the resulting solution, and the glass dried, whereby to form a silica film on the glass surface. The exact composition of the silica films produced according to any of the above processes is not known and is exceedingly difficult to determine because of the unusual thinness of the film. However, the film is composed preponderantly of silicon together with some oxygen, and probably comprises silica as such or combined as a silicate. The term "silica" is intended to include transparent films containing silicon and oxygen, whether or not the exact composition corresponds to the formula ($SiO_2$) for silica.

In lieu of silica films, thin transparent films of metal oxides other than tin oxide may be applied to provide a surface of low $Na_2O$ content. Thus, a titanium dioxide coating may be applied by spraying the glass in atmospheric air with titanium tetrachloride while the glass is heated to 220° C. Moreover, glass heated to 800–1100° F. may be sprayed with an aqueous solution of metal salts of aluminum, antimony, cobalt, iron, nickel, zinc, thallium, copper, silver or lead. Films of highest clarity usually are obtained using the acetates of these metals. However, the chlorides, bromides, nitrates, and iodides frequently are suitable. In the case of thallium, a clear film is obtained using the malonate or other water soluble salt. Boric acid and boron trifluoride solutions also may be used. In each case a thin film, usually having a thickness of about 25 to 150 millimicrons, is readily formed, and such film isolates the sodium in the glass from the stannic chloride or like compounds used to produce the tin oxide coating. Furthermore, calcium or magnesium fluoride films may be deposited by vacuum evaporation methods.

All of such films or surfaces will be either free from $Na_2O$ or contain no more $Na_2O$ than the limit prescribed above.

Following any of these coating operations, the tin oxide conductive metal coating is deposited upon the cleaned coated glass base as described above.

The above description has been primarily concerned with the production of a glass produced having minimum transparency haze and maximum electroconductivity by deposition of a tin oxide film thereupon. The invention is applicable to the production of transparent electroconductive films of low haze composed of other metals or metal oxides, and such other transparent electroconductive coatings are considered equivalents of the tin oxide coating. Coatings having low resistivity may be prepared by applying an aqueous solution of indium trichloride or cadmium acetate, bromide or chloride to a glass base (having the low surface $Na_2O$ content contemplated) heated to 800–1100° F., according to the herein described methods. Such coatings largely comprise an oxide of the metal compound, or a mixture of oxides where a mixture of compounds is used, and probably contain small amounts of the free metal. Use of other transparent electroconductive films is within the scope of this invention, and they may be used in lieu of the tin oxide coating.

The products prepared according to this invention may be used for a wide variety of uses. Because the film is continuous, an electric current will flow therethrough. Viewing closures or windows in vehicles, such as aircraft or automobiles, or in buildings are particularly valuable when constructed of glass panels provided with a transparent electroconductive coating applied by the presently contemplated process. In such use, the conductive coating is placed in series with an electric circuit, using the film or coating as a heating element for heating the panel. By so heating the panel, formation of ice or fog on the panel is prevented.

In preparing such panels, an electroconductive coating normally is deposited upon but one side of the sheet. However, both sides of the panel usually are dealkalized in order to avoid strains which otherwise are found to develop. Other articles, including electrical insulators, grid leaks, space heaters, mirrors, etc., may be coated according to methods herein described.

The following examples are illustrative:

Example I

Lime-soda polished commercial glass sheets, 17 inches by 25 inches by 7/64 inch, were coated by spraying with a Florida kaolin slip containing:

| | |
|---|---|
| Kaolin _____ grams__ | 475 |
| Methanol _____ milliliters__ | 1825 |
| Water _____ do____ | 1825 |
| Dioctyl sodium sulfosuccinate aqueous solution containing 10 per cent by weight of dioctyl sodium sulfosuccinate milliliters__ | 187 |

Spraying was continued until the plate was covered with a thin opaque coating.

The coated sheets were allowed to dry and were placed in a lehr heated to where they were carried through a heating zone over a period of one hour, being subjected to a gradually increasing temperature. In this operation, the glass was heated at the maximum temperature of 975° F. for 10 to 15 minutes. Thereafter, the sheets were removed, cooled, and scrubbed with water to remove the clay.

Sheets de-alkalized according to this process normally exhibit removable $Na_2O$ content of 0.1 to 0.2 milligram per square foot, even after heating to temperatures as high as 1160° F. for 4 minutes, when $Na_2O$ is determined as sodium magnesium uranium acetate according to the method above described.

A battery of three De Vilbis spray guns, capable of spraying an atomized spray of oval cross-section, were mounted in a row so that their nozzles were directed substantially in a horizontal plane toward a focal point. The two outer guns were directed so that the angle between the nozzles was approximately 30 degrees. The middle gun was mounted so that the nozzle was directed toward the focal point of the outer nozzles and approximately bisected the angle between the two outer nozzles. Each of the nozzles was mounted so that the end of the nozzle was approximately 11 inches from the focal point.

The washed glass treated as described above was vertically suspended, narrow sides being in a horizontal plane, and was heated in a furnace chamber at a temperature of 1150° F. for 3 minutes. The two outer guns were filled with a solution prepared by mixing the following components in the proportions:

| | |
|---|---|
| Stannic chloride pentahydrate_____grams__ | 900 |
| Methanol _____milliliters__ | 63 |
| Phenyl hydrazine _____grams__ | 21 |
| Dioctyl sodium sulfosuccinate solution milliliters__ | 30 |

This solution composed of:

| | |
|---|---|
| Dioctyl sodium sulfosuccinate grams__ | 10 |
| Methanol _____do____ | 45 |
| Water _____do____ | 45 |

Spray guns were turned on; the air pressure imposed in the two outer guns being 80 pounds per square inch and in the middle gun 80 pounds per square inch. The middle gun was empty. In consequence, the spray from the two outer guns impinged and caused the spray to fan out in a vertical direction whereby a relatively narrow high speed stream of spray of rectangular cross-section was produced. This stream was blown forward by the blast of air from the middle nozzle.

Immediately after the heating period, the glass sheet was held vertically with its front face perpendicular to the middle nozzle, and was moved across the spray so that the guns were directed at a point midway between the top and bottom edges of the sheet. The sheet was held approximately 4 inches from the focal point. Under these conditions, a long thin band of spray was blown against the hot glass surface, forming a coating as the sheet moved across the spray.

The air blast from the middle nozzle caused rapid movement of the spray toward the sheet whereby conversion of stannic chloride to tin oxide, before the spray struck the sheet, was substantially minimized. Furthermore, the air blast aided in creating a draft across the sheet toward the side edges thereof, thus minmimizing opportunity for fog created by the spray from contacting the sheet, and rapidly removing excess and partially decomposed spraying solution from the surface of the sheet. This process substantially minimized haze.

The rate of moving the sheet across the spray was such as to require approximately 6 seconds. During this period, approximately 20 cc. of solution was sprayed from each gun. Following the spraying operation, the sheet was tempered to a temper of approximately one-fourth that of full temper.

The resulting sheet had a transparent, iridescent tin oxide coating which had a resistivity of approximately 125 ohms per unit square. The thickness of the coating was approximately 250–325 millimicrons.

The spraying need not be conducted with three spray guns, as described above, since a single spray gun will produce a clear film.

*Example II*

Sheets of lime-soda plate glass 7/64 inch in thickness were stacked with ½ inch ceramic block spacers and heated in an atmosphere of sulphur dioxide at 1200° F. for 30 minutes. The plates were then cooled and washed to remove water soluble salts.

The glass sheets so cleaned were placed in a furnace chamber heated to 1160° F. for 4½ minutes, and then were removed from the furnace and sprayed in air for 12 seconds with the aqueous solution of stannic chloride described in Example I, using a conventional atomizing spray gun operating at an air pressure of 20 pounds per square inch. About 15 cubic centimeters of solution was sprayed during this period. The coating thus obtained was quite free from haze.

*Example III*

The process of Example II was repeated except that, in lieu of $SO_2$ treatment, the removal of alkali was effected by heating plates, the size of which were 12 inches by 12 inches by 9/64 inch, to about 1140° F. for 4½ minutes, and spraying the plates with an aqueous solution containing 25 per cent by weight of HCl for 20 seconds, using a conventional atomizing spray gun. Approximately 10 cubic centimeters of the HCl solution was used per plate.

*Example IV*

Glass sheets were immersed in boiling water for 6 hours in order to remove surface alkali. Such sheets were dried and coated according to the process of Example I to produce coated glass sheets which were very clear and free from haze.

*Example V*

The process of Example IV was repeated, boiling the glass in an aqueous cuprous chloride solution containing 4 per cent by weight of cuprous chloride, and a clear sheet was obtained.

*Example VI*

A mixture of 1800 grams of ethyl silicate, 1800 grams of ethyl alcohol, 180 grams of water, and 18 grams of 1 per cent (by weight) aqueous HCl solution is heated at reflux temperature under a reflux condenser for one hour.

Glass sheets are dipped in the resulting solution, drained, and allowed to dry. These sheets are heated to 1160° F. and coated according to the process of Example I.

*Example VII*

A solution is prepared by mixing 100 parts by volume of carbon tetrachloride with 1 part by volume of anhydrous silicon tetrachloride and 5 parts by volume of acetone. Lime-soda glass sheets are dipped in this solution, drained, and allowed to dry. During dipping and drying, the atmospheric temperature remained at about 75° F., and the relative humidity above 38 per cent. After drying, the sheets are rubbed with a cloth to remove the white bloom upon the plates.

The cleaned sheets, which possess a thin colorless silica film, are heated to 1150° F. and coated as in Example I.

*Example VIII*

A glass plate is dipped in a solution made by adding 5 per cent by weight of titanium tetrachloride to ethyl alcohol, and cooling the reaction mixture thus obtained. The dipped glass plate is dried, cleaned, and then is heated and coated as in Example I.

*Example IX*

A small soda-lime glass plate was heated for 2½ minutes in a furnace chamber at a temperature of 1150° F. This hot sheet was sprayed for 2.5 seconds at 40 pounds per square inch pressure, using a conventional spray gun, with an aqueous solution containing 20 per cent by weight of silver nitrate and 5 per cent by weight of aqueous formaldehyde containing 40 per cent by weight of formaldehyde.

The treated glass was cleaned and heated at 1150° F. for 2½ minutes and sprayed for 1.5 seconds at 40 pounds per square inch pressure, using a conventional spray gun, with a solution prepared as follows:

Seven grams of phenyl hydrazine hydrochloride was dissolved in 30 milliliters of water. Three hundred grams of stannic chloride pentahydrate was melted at 140° F., and the two solutions were mixed. A very clear plate was obtained.

This process also may be performed using the stannic chloride solutions of Example I. Moreover, saturated aqueous solutions of aluminum chloride, copper chloride, antimony chloride, cobalt chloride, nickel chloride, ferrous chloride or zinc chloride may be used in lieu of silver nitrate.

*Example X*

A sheet of glass is heated to 1200° F. and sprayed with a solution of 30 grams of $TiCl_4$ in 60 grams of methanol. This product is then coated with a tin oxide coating as in Examples I or III.

*Example XI*

In a series of tests, polished plate glass sheets, 4 inches by 8 inches by 7/64 inch, were heated for 2¼ minutes at a furnace temperature of 1250° F. The solutions having the compositions indicated below were made up and 15 grams of each solution was sprayed upon the heated glass plates, and the plates were allowed to cool.

1. 20 grams zinc acetate $Zn(C_2H_3O_2)_2 \cdot 2H_2O$
   50 grams water
   5 grams phenyl hydrazine hydrochloride 2. 75 grams cadmium acetate
   100 grams water 3. 20 grams chromium acetate $Cr(C_2H_3O_2)_3 \cdot H_2O$
   50 grams water 4. 50 grams cobalt acetate $Co(C_2H_3O_2) \cdot 4H_2O$
   50 milliliters water 5. 7 grams copper acetate $Cu(C_2H_3O_2)_2 \cdot H_2O$
   50 grams water 6. 10 grams aluminum acetate
   $Al_2O \cdot (C_2H_3O_2)_4 \cdot 4H_2O$
   25 milliliters 16 Normal ammonium hydroxide 7. 50 grams lead acetate $Pb(C_2H_3O_2) \cdot 3H_2O$
   100 grams water 8. 30 grams nickel acetate $Ni(C_2H_3O_2)_2 \cdot 4H_2O$
   60 grams methanol These sheets are coated with a tin oxide coating according to Examples I or III.

*Example XII*

A solution of:

40 grams of antimony trichloride
20 milliliters of anhydrous methanol 20 milliliters of concentrated hydrochloric acid (37% HCl)

5 milliliters of aqueous hydrogen peroxide containing 30% H₂O₂ was prepared. Plate glass sheets, 3 inches by 6 inches by 9/64 inch, were heated to 800° F. and sprayed with the above solution to produce a film of first or second order violet. These sheets were re-heated to 1150° F. and coated with tin oxide by spraying with the stannic chloride solution described in Example I.

The process of the above examples may be performed using other de-alkalizing processes. For example, glass sheets may be boiled in water or aqueous solutions of hydrochloric acid, sulphuric acid, phosphoric acid, or aqueous solutions of copper sulphate, ferric nitrate, ferric chloride, etc. Furthermore, glass sheets may be heated in an autoclave under superatmospheric pressure, for example, at 50 pounds per square inch steam pressure, while immersed in hydrochloric acid or other acid.

Furthermore, in lieu of the stannic chloride or like solution used according to the above examples to produce a tin oxide electroconductive coating, other coating solutions may be used. Typical coating compositions suitable for this purpose include solutions of the halides (chlorides, bromides, iodides or fluorides) and acetates of indium, tin, or cadmium. Such solutions may contain other agents to improve conductivity of the films produced according to practices known to the art.

Typical solutions which may be used in lieu of stannic chloride are the following:

1. 2 parts by volume of a saturated aqueous solution of cadmium bromide
   1 part by volume of aqueous hydrogen peroxide containing 30% by weight of H₂O₂
2. Aqueous indium trichloride containing 200 grams per liter of InCl₃
3. Saturated InCl₃ in anhydrous methanol containing 1% of antimony trichloride or of 48% aqueous hydrofluoric acid, the 1% being based upon the InCl₃
4. Saturated aqueous indium triacetate or cadmium acetate.

Although the present invention has been described with reference to the specific details of certain embodiments thereof, it is not intended that such details shall be regarded as limitations upon the scope of the invention except insofar as included in the accompanying claims.

This application is a continuation-in-part of my application Serial No. 36,420, filed July 1, 1948, and now forfeited.

What is claimed:

1. A method of providing a substantially haze-free glass base having a transparent electroconductive coating thereon which comprises treating a glass base which has the composition:

| | Per cent by weight |
|---|---|
| Alkali metal oxide of the group consisting of Na₂O and K₂O | 10 to 35 |
| Alkaline earth metal oxide of the group consisting of CaO and MgO | 5 to 25—the CaO content being not less than 5 per cent by weight |
| SiO₂ | 50 to 75 |
| Al₂O₃ | Up to 20 | with a chemical agent which has an affinity for sodium whereby to reduce the amount of Na₂O upon the surface of the glass, heating the treated glass to a temperature above about 400° F. but below the temperature at which the glass melts, and contacting the hot glass with stannic chloride whereby to deposit a transparent electroconductive tin oxide coating upon a treated surface of the glass.

2. A method of producing a substantially haze-free glass base having a transparent electroconductive coating thereon which comprises treating a glass base which has the composition:

| | Per cent by weight |
|---|---|
| Alkali metal oxide of the group consisting of Na₂O and K₂O | 10 to 35 |
| Alkaline earth metal oxide of the group consisting of CaO and MgO | 5 to 25—the CaO content being not less than 5 per cent by weight |
| SiO₂ | 50 to 75 |
| Al₂O₃ | Up to 20 | with a chemical agent which has an affinity for sodium whereby to reduce the amount of Na₂O upon the surface of the glass, heating the treated glass to a temperature above about 400° F. but below the temperature at which the glass melts, and contacting the hot glass with a film-forming decomposable tin halide whereby to deposit a transparent electroconductive tin oxide coating upon a treated surface of the glass.

3. A method of providing a substantially haze-free glass base having a transparent electroconductive coating thereon which comprises treating a glass base which has the composition:

| | Per cent by weight |
|---|---|
| Alkali metal oxide of the group consisting of Na₂O and K₂O | 10 to 35 |
| Alkaline earth metal oxide of the group consisting of CaO and MgO | 5 to 25—the CaO content being not less than 5 per cent by weight |
| SiO₂ | 50 to 75 |
| Al₂O₃ | Up to 20 | with a chemical agent which has an affinity for sodium whereby to reduce the amount of Na₂O upon the surface of the glass, heating the treated glass to a temperature above about 400° F. but below the temperature at which the glass melts, and contacting the hot glass with a film-forming decomposable compound of a metal of the group consisting of tin, cadmium, and indium, whereby to deposit a transparent electroconductive coating of an oxide of a metal of said group upon a treated surface of the glass.

4. The method of claim 3 wherein the glass has the composition:

| | Per cent by weight |
|---|---|
| Alkali metal oxide of the group consisting of Na₂O and K₂O | 10 to 18 |
| Alkaline earth metal oxide of the group consisting of CaO and MgO | 5 to 16 |
| SiO₂ | 65 to 75 |
| Al₂O₃ | Up to 5 |

5. The method of claim 4 wherein the film-forming compound is a halide.

6. The method of claim 5 wherein the surface of the glass base is predominantly silica.

7. A method of providing a substantially haze-free glass base having a transparent electroconductive coating thereon which comprises treating a glass base which has the composition:

| | Per cent by weight |
|---|---|
| Alkali metal oxide of the group consisting of Na₂O and K₂O | 10 to 35 |
| Alkaline earth metal oxide of the group consisting of CaO and MgO | 5 to 25—the CaO content being not less than 5 per cent by weight |
| SiO₂ | 50 to 75 |
| Al₂O₃ | Up to 20 | with a chemical agent which has an affinity for sodium whereby to reduce the amount of Na$_2$O upon the surface of the glass, heating the treated glass to a temperature above about 400° F. but below the temperature at which the glass melts, and contacting the hot glass with a film-forming decomposable compound of tin whereby to deposit a transparent electroconductive coating of tin oxide upon a treated surface of the glass.

8. A method of providing a substantially haze-free glass base having a transparent electroconductive coating thereon which comprises heating a glass base which has the composition:

| | Per cent by weight |
|---|---|
| Alkali metal oxide of the group consisting of Na$_2$O and K$_2$O | 10 to 35 |
| Alkaline earth metal oxide of the group consisting of CaO and MgO | 5 to 25—the CaO content being not less than 5 per cent by weight |
| SiO$_2$ | 50 to 75 |
| Al$_2$O$_3$ | Up to 20 | in contact with clay to a temperature above about 500° F. but below the temperature at which the glass melts whereby to remove alkali from a surface thereof, removing the clay from the glass surface, heating the glass to a temperature above about 400° F. but below the temperature at which the glass melts, and contacting the hot glass with a film-forming decomposable compound of a metal of the group consisting of tin, cadmium, and indium whereby to deposit a transparent electroconductive coating of an oxide of a metal of said group upon a treated surface of the glass.

9. A method of providing a substantially haze-free glass base having a transparent electroconductive coating thereon which comprises heating a glass base which has the composition:

| | Per cent by weight |
|---|---|
| Alkali metal oxide of the group consisting of Na$_2$O and K$_2$O | 10 to 35 |
| Alkaline earth metal oxide of the group consisting of CaO and MgO | 5 to 25—the CaO content being not less than 5 per cent by weight |
| SiO$_2$ | 50 to 75 |
| Al$_2$O$_3$ | Up to 20 | in contact with kaolin to a temperature above about 500° F., but below the temperature at which the glass melts, whereby to reduce the Na$_2$O content of a surface of the glass, removing the kaolin from the glass surface, heating the glass to a temperature above about 400° F., but below the temperature at which the glass melts, and contacting the treated surface of the hot glass with stannic chloride whereby to deposit a transparent electroconductive coating of tin oxide upon a treated surface of the glass.

10. A transparent glass article which comprises a glass base having the composition:

| | Per cent by weight |
|---|---|
| Alkali metal oxide of the group consisting of Na$_2$O and K$_2$O | 10 to 35 |
| Alkaline earth metal oxide of the group consisting of CaO and MgO | 5 to 25—the CaO content being not less than 5 per cent by weight |
| SiO$_2$ | 50 to 75 |
| Al$_2$O$_3$ | Up to 20 | having a surface, the Na$_2$O content thereof being less than one milligram per square foot, and a continuous coating of transparent electroconductive oxide of a metal of the group consisting of tin, cadmium, and indium on said surface.

11. The article of claim 10 wherein the oxide is tin oxide.

12. The article of claim 10 wherein the surface of said glass base is predominantly silica.

13. The article of claim 10 wherein the glass has the composition:

| | Per cent by weight |
|---|---|
| Alkali metal oxide of the group consisting of Na$_2$O and K$_2$O | 10 to 18 |
| Alkaline earth metal oxide of the group consisting of CaO and MgO | 5 to 16 |
| SiO$_2$ | 65 to 75 |
| Al$_2$O$_3$ | Up to 5 |

14. The article of claim 10 wherein the Na$_2$O content of the surface is less than 0.5 milligram per square foot.

15. The article of claim 12 wherein the oxide is tin oxide.

EARL R. OLSON.

REFERENCES CITED

The following references are of record in the file of this patent:

UNITED STATES PATENTS

| Number | Name | Date |
|---|---|---|
| 2,401,537 | Adams | June 4, 1946 |
| 2,417,147 | Wood | Mar. 11, 1947 |
| 2,429,420 | McMaster | Oct. 21, 1947 |
| 2,442,976 | Heany | June 8, 1948 |